United States Patent
Back et al.

[11] 3,870,695
[45] Mar. 11, 1975

[54] HEAVY METAL COMPLEXES OF AZO DYESTUFFS CONTAINING A 2-AMINO-3-HYDROXYPYRIDINE AS COUPLING COMPONENT

[75] Inventors: Gerhard Back, Loerrach, Germany; Arthur Buehler, Rheinfelden, Switzerland

[73] Assignee: Ciba-Geigy AG, Basel, Switzerland

[22] Filed: July 21, 1972

[21] Appl. No.: 274,147

[30] Foreign Application Priority Data
July 27, 1971 Switzerland................ 11034/71

[52] U.S. Cl. ............ 260/146 R, 8/42 R, 8/42 B, 8/43, 260/145 B, 260/146 D, 260/146 T, 260/143, 260/153, 260/154, 260/155, 260/156, 260/290 HL, 260/296 R
[51] Int. Cl. . C09b 45/14, C09b 45/20, C09b 45/24
[58] Field of Search.................. 260/156, 146 R

[56] References Cited
UNITED STATES PATENTS

| | | | |
|---|---|---|---|
| 1,856,601 | 5/1932 | Tisza et al............ | 260/156 |
| 2,068,353 | 1/1937 | Schneiderwirth........ | 260/256 |
| 2,294,380 | 9/1942 | Braker................ | 260/156 |
| 2,307,650 | 1/1943 | Tisza et al............ | 260/156 X |
| 2,426,313 | 8/1947 | Ludwig et al.......... | 260/156 X |
| 2,519,470 | 8/1950 | Hoffman.............. | 260/156 X |
| 2,801,996 | 8/1957 | Siegel et al........... | 260/146 R |
| 2,830,042 | 4/1958 | Dittmar et al......... | 260/146 R |
| 2,860,141 | 11/1958 | Larrabee............. | 260/156 X |
| 3,114,754 | 12/1963 | Lodge et al........... | 260/156 X |
| 3,419,570 | 12/1968 | Petersen et al........ | 260/156 X |

OTHER PUBLICATIONS
Gusev et al., Index Chemicus, Vol. 27, 86189 (1967).

*Primary Examiner*—Floyd D. Higel
*Attorney, Agent, or Firm*—Joseph G. Kolodny; Edward McC. Roberts; Prabodh I. Almaula

[57] ABSTRACT

The heavy metal complexes of azo dyestuffs of formula

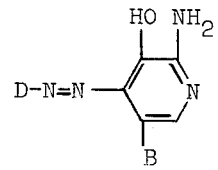

where B is hydrogen, chloro or bromo and D is the residue of a diazo component of the benzene or naphthalene series that contains an hydroxyl, carboxyl or amino group in the position ortho to the azo group, are useful to dye substrates, notably wool, in level green and blue shades having good resistance to acid, alkali, light and rubbing.

2 Claims, No Drawings

HEAVY METAL COMPLEXES OF AZO DYESTUFFS CONTAINING A 2-AMINO-3-HYDROXYPYRIDINE AS COUPLING COMPONENT

The present invention relates to azo compounds which correspond to the formula

D-N=N-K (1)

wherein D represents the radical of an aromatic diazo component and K represents the radical of a 2-amino-3-hydroxypyridine or a 5-halogeno-2-amino-3-hydroxypyridine. It relates also to heavy metal complexes of azo compounds of the formula (1).

Valuable azo compounds of the kind according to the invention are those of the formula

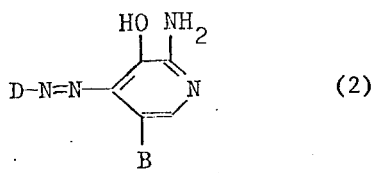

wherein D has the same meaning as in formula (1) and B represents chlorine, bromine or hydrogen.

Compounds of particular interest are the heavy metal complexes of the azo compounds of the formula (2), wherein, for example, iron, manganese, nickel, copper and especially cobalt and chromium can be used as complex-forming metals. The heavy metal complexes can contain one or two molecules of azo compounds of the formula (2) bonded to one metal atom (1:1-complexes and 1:2-complexes, respectively). In 1:2-complexes it is however also possible for one of the two ligand molecules to be an azo compound which does not contain the radical of 2-amino-3-hydroxypyridine or of a 5-halogeno-2,3-dihydroxypyridine as the coupling component, that is to say, for example, a compound of the azobenzene type, which contains appropriate complex-forming groups.

The coupling component in formula (2) is, in particular, the radical of 2-amino-3-hydroxypyridine or of 5-chloro- or 5-bromo-2-amino-3-hydroxypyridine.

The diazo component D represents an aromatic radical which can itself contain an azo group or is derived from a compound of the anthraquinone, nitroaryl, phthalocyanine or stilbene series or the like. In particular, D is a benzene or naphthalene radical. The diazo component D can be substituted in the usual manner by halogen atoms, hydroxyl, amino, alkyl, aryl, alkoxy, aryloxy, acylamino, carboxyl, sulphonic acid or nitro groups and the like. In the case of heavy metal complexes of the compounds according to the invention, the diazo component D must possess a complex-forming substituent, such as, for example, a hydroxyl, amino or carboxyl group, in the ortho-position to the azo bridge.

Amongst the compounds of the formulae (1) or (2) which are not bonded to a heavy metal atom, compounds of interest are both those which do not contain any water-solubilising groups, and, especially, those which are water-soluble, that is to say, for example, which contain sulphonic acid groups or carboxylic acid groups. In particular, the compounds can possess one or more than one reactive radical, such as, for example, a halogenated propionic acid radical.

In heavy metal complexes of azo compounds of the formulae (1) and (2), it is also possible for one or more water-solubilising groups to be present. There may also be bonded one or more reactive groups which, in the event that the heavy metal complex only possesses compounds of the formulae (1) or (2) as ligands, are in particular contained in the diazo components of the azo compounds which are bonded as a complex.

In 1:2-complexes in which, apart from a molecule of a compound of the formulae (1) or (2), an azo compound which does not possess a 2-amino-3-hydroxypyridine or a 5-halogeno-2,3-dihydroxypyridine as the coupling component is bonded as the ligand, a reactive radical can in particular also be present in the diazo component or in the coupling component of the azo compounds in question.

Suitable reactive radicals are groupings capable of reaction with the hydroxyl groups of cellulose or the amino groups of polyamides to form a covalent chemical bond. Such a grouping is, in particular, a low molecular alkanoyl or alkylsulphonyl radical substituted by a removable atom or a removable group, a low molecular alkenoyl or alkenesulphonyl radical which is optionally substituted by a removable atom or a removable group, a carbocyclic or heterocyclic radical, containing 4-membered, 5-membered or 6-membered rings, which is bonded via a carbonyl or sulphonyl group and is substituted by a removable atom or a removable group, or a triazone or pyrimidine radical which is directly bonded via a carbon atom and is substituted by a removable atom or a removable group, or contains such a radical. The reactive radical of an aliphatic, saturated or unsaturated alkyl radical which preferably contains halogen atoms and is bonded via a —NH— group, in particular the α,β-dibromopropionyl radical or α-bromoacrylyl radical, is preferred.

The manufacture of the azo compounds of the formula (1) or of the heavy metal complexes in question is effected by coupling a diazotised amine of the formula D-NH$_2$ with a 2-amino-3-hydroxypyridine or a 5-halogeno-2,3-dihydroxypyridine, optionally followed by reaction of the azo compound with an agent which donates a heavy metal.

The diazotisation of the amine takes place according to methods which are in themselves known, for example with the aid of hydrochloric acid and sodium nitrite. The coupling with the 2-amino-3-hydroxypyridine or the 5-halogeno-2,3-dihydroxypyridine also takes place according to methods which are in themselves known, in an acid to alkaline medium.

The reaction with the heavy metal donor takes place according to customary processes, in various solvents such as, for example, water, ethanol, formamide, glycol ethers, pyridine and others, depending on the solubility of the components, optionally at elevated temperature, in a weakly acid to alkaline medium.

The manufacture of 1:2-complexes can take place in a single reaction step, by reaction of 1 mol of a compound which donates a heavy metal with 2 mols of a corresponding azo compound, or can take place in stages. In the latter case, a corresponding azo compound, for example an azo compound of the formula (1), is reacted with a metal-donating agent to give a 1:1-complex, and this is subsequently reacted with an equivalent quantity of a corresponding metal-free azo compound to give the 1:2-complex. This procedure is advisable particulary if 1:2-complexes with different ligands are to be manufactured. Such 1:2-complexes in which only one of the two ligands is a compound of the formula (1), can also be converted into the desired 1:2-complex by reaction of an azo compound which does not contain any 2-amino-3-hydroxypyridine or 5-halogeno-2-amino-3-hydroxypyridine as the coupling component, with a chromium-donating agent and subsequent reaction of the resulting 1:1-complex with a corresponding azo compound of the formula (1).

Valuable complex compounds are obtained by using cobalt(II), chromium(III), nickel(II) and copper(II) salts as metal donors.

After completion of the coupling reaction, the compounds can be isolated from the coupling mixture by filtration for the metallising procedure. They are conveniently used as a filter cake without intermediate drying. In many cases it is also possible to carry out the treatment with the metal donors directly in the coupling mixture, without intermediate separation.

The treatment with the chromium or cobalt donors takes place, according to the present process, in such a way that a chromium-containing or cobalt-containing compound is formed, optionally accompanied by the removal of an alkyl radical of an alkoxy group possibly present in the o-position to the azo group; this compound contains one or half an atom of chromium or half an atom of cobalt, bonded as a complex, per molecule of azo compound. Accordingly, the metallisation is appropriately carried out with those chromium or cobalt donors, and according to those methods, which, according to experience, yield complex compounds of this composition. It is generally advisable to use one, or less than one, atom of chromium or cobalt per molecule of an azo dyestuff, and/or to carry out the metallisation in a weakly acid to alkaline agent, if appropriate in the presence of organic solvents. Accordingly, those metal compounds which are stable in an alkaline medium are also particularly suitable for carrying out the process, examples being complex chromium compounds or cobalt compounds of aliphatic dicarboxylic acids or hydroxycarboxylic acids, such as, for example, of oxalic acid, of lactic acid, of citric acid and especially of tartaric acid, or complex chromium compounds of aromatic hydroxycarboxylic acids such as, for example, of salicylic acid. Simple compounds of divalent cobalt, such as cobalt sulphate or cobalt acetate, or optionally freshly precipitated cobalt hydroxide can also, and in particular with advantage, be used as cobalt donors according to the present process.

The conversion of the azo compounds of the formula (1) into the complex metal compounds is advantageously carried out with warming, in an open vessel or under pressure, optionally in the presence of suitable additives, for example in the presence of salts of organic acids, of bases, of organic solvents or of further agents which promote complex formation and/or promote the splitting off of the alkyl radical of the alkoxy group which may be present in the o-position to the azo group.

Instead of starting with o,o'-dioxyazo compounds, it is also possible to use the corresponding o-alkoxy-o'-oxyazo compounds; in this case, the alkyl group of the o-alkoxy radical is split off during the metallisation and the same metal complexes as from the dihydroxyazo compounds are obtained.

A particular embodiment of the present process is characterised by starting from mixtures of different metallisable azo compounds which correspond to the initially mentioned general definition, or of which at least one corresponds to this definition. The treatment with the chromium-donating or cobalt-donating agents is here again carried out in such a way that chromium-containing or cobalt-containing complexes are produced which per molecule of azo compound contain one or half an atom of chromium or half an atom of cobalt bonded as a complex.

Valuable compounds are the cobalt compounds and chromium compounds of this kind which contain two o,o'-dioxymonoazo compounds corresponding to the general formula (1), both of which have the same composition.

As diazo components which can be used for the manufacture of the compounds of the formula (1) according to the invention, or of the corresponding heavy metal complexes, the diazo compounds of the following amines may be mentioned: aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carboethoxybenzene, 1-amino-2-chloro-4-methylsulphonylbenzene, 1-amino-2-methylsulphonyl-4-chlorobenzene, 1-amino-2,4-dinitro-6-methylsulphonylbenzene, 1-amino-2,4-dinitro-6-(2'-hydroxyethylsulphonyl)-benzene, 1-amino-2,4-dinitro-6-(2'-chloroethylsulphonyl)-benzene, 1-amino-2-methylsulphonyl-4-nitrobenzene, 1-amino-4-methylsulphonyl-2-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-aminobenzoic acid cyclohexyl ester, 1-amino-2,4-dinitro-6-chlorobenzene and especially 1-amino-2-cyano-4-nitrobenzene, 1-aminobenzene-2-, -3- or -4-sulphonic acid amides, such as the N-methylamide or N,N-dimethylamide or N,N-diethylamide, 2-aminonaphthalene-6-sulphonic acid N,γ-isopropoxypropylamide, 1-aminobenzene-2-, -3- or -4-sulphonic acid N,γ-isopropoxypropylamide, 1-aminobenzene-2-, -3- or -4-sulphonic acid N-isopropylamide, 1-aminobenzene-2-, -3- or -4-sulphonic acid N,γ-methoxypropylamide, 1-aminobenzene-2-, -3- or -4-sulphonic acid N,N-bis-(β-hydroxy-ethyl)-amide, 1-amino-4-chlorobenzene-2-sulphonic acid amide and the N substituted derivatives, 4-aminoazobenzene, 3,2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-chloro-4-aminoazobenzene, 2'- or 3'-chloro-4-aminoazobenzene, 3-nitro-4-amino-2',4'-dichloroazobenzene, 4-aminoazobenzene-4'- sulphonic acid amide, 1- or 2-aminonaphthalene, 4-methoxy-5-chloro-2-aminophenol, 6-acetylamino-4-chloro-2-aminophenol, 6-nitro-4-chloro-2-aminophenol, 6-nitro-4-methyl-2-aminophenol, 3-amino-4-hydroxy-acetophenone, 6-nitro-4-acetylamino-2-aminophenol, 5-nitro-3-amino-4-hydroxyacetophenone, 2-aminophenol-4-carboxylic acid amide, 4,6-dichloro-2-aminophenol, 3,4,6-trichloro-2-aminophenol, 4-nitro-6-chloro-2-aminophenol, 6-nitro- or 6-chloro-2-aminophenol-4-sulphonic acid amide, 4-nitro-2-aminophenol-5- or -6-sulphonic acid amide, 2-aminophenol-5-methylsulphone, 2-aminophenol, 4- or 5-nitro-2-aminophenol, 4- or 5-chloro-2-aminophenol, 4,5-dichloro-2-aminophenol, 4-chloro-5-nitro-2-aminophenol, 2-aminophenol-4- or 5-sulphonic acid, 3,4,6-trichloroaminophenol, 4-chloro-2-aminophenol-6-sulphonic acid, 6-chloro-2-aminophenol-4-sulphonic acid, 4-nitro-2-aminophenol-6-sulphonic acid, 6-nitro-2-aminophenol-4-sulphonic acid, 2-aminophenol-4,6-disulphonic acid, 4,6-dinitro-2-aminophenol, 6-acetylamino-2-aminophenol-4-sulphonic acid, 4-acetylamino-2-aminophenol-6-sulphonic acid, 4-methyl-2-aminophenol, 4-methoxy-2-aminophenol, 2-aminophenol-4-sulphonamide, 2-aminophenol-4-sulphone-N,β-hydroxyethylamide, 2-aminophenol-4-sulphone-N-methylamide, 2-aminophenol-5-sulphonamide, 4-chloro-2-aminophenol-5- or -6-sulphonamide, 2-aminophenol-4-sulphone-N,N-dimethylamide, 2-aminophenol-4-methylsulphone, 2-aminophenol-4-ethylsulphone, 6-acetylamino-4-nitro-2-aminophenol, 2-aminophenol-4,β-hydroxyethylsulphone, anthranilic acid, 2-amino-3-naphthoic acid, 4- or 5-chloroanthranilic acid, 4- or 5-nitroanthranilic acid, 4- or 5-acetylaminoanthranilic acid, 4- or 5-sulphoanthranilic acid, anthranilic acid 4-sulphonamide, anthranilic acid 4- or 5,β-hydroxyethylsulphone, anthranilic acid 4- or 5-ethylsulphone, 4-chloro-2-aminophenol-5-sulphonic acid N-methylamide, 4- or 5-benzoylaminoanthranilic acid, 2-anisidine, 4- or 5-chloro-2-anisidine, 4- or 5-nitro-2-anisidine, 2-anisidine-4- or -5-sulphonic acid, 2-methoxy-5-methylaniline, 2,5-dimethoxyaniline, 2-anisidine-4- or -5-β-hydroxyethylsulphone, 2-amino-1-naphthol-4,8-disulphonic acid, 1-amino-2-naphthol-4-sulphonic acid, 1-amino-2-naphthol-4-sulphonamide, 6-nitro-1-amino-2-naphthol-4-sulphonic acid, 6-acetylamino-1-amino-2-naphthol-4-sulphonic acid, 4-(2′,5′-disulphophenylazo)-2-methoxy-5-methylaniline, 4-(2′,5′-disulphophenylazo)-2,5-dimethoxyaniline, 4-(2′,5′-disulphophenylazo)-2-methoxy-1-naphthylamino-6-sulphonic acid, 4-(1′,5′-disulphonaphth-2′-ylazo)-2,5-dimethoxyaniline, 4-(2′,3′- or 4′-sulphophenylazo)-2-methoxyaniline, dianisidine, benzidine-3,3′-dicarboxylic acid, 4-(2′-, 3′- or 4′-sulphophenylazo)-2-methoxy-5-methylaniline, 4-(2′-, 3′- or 4′-sulphophenylazo)-2,5-dimethoxyaniline, 4-(2′, 5′- or 3′,5′-disulphophenylazo)-2-methoxyaniline, 4-(3′,5′-disulphophenylazo)-2-methoxy-5-methylaniline, 4-(3′,5′-disulphophenylazo)-2,5-dimethoxyaniline, 4-(2′-carboxy-4′- or -5′-sulphophenylazo)-2-methoxyaniline, 4-(2′-carboxy-4- or -5′-sulphophenylazo)-2,5-dimethoxyaniline, 4-(2′-carboxy-4′- or -5′-sulphophenylazo)-2-methoxy-5-methylaniline, 4-(6′,8′-disulphonaphth-2′-ylazo)-2-methoxyaniline, 4-(6′,8′-disulphonaphth-2′-ylazo)-2-methoxyaniline, 4-(6′,8′-disulphonaphth-2′-ylazo)-2-methoxy-5-methoxyaniline, 4-(6′,8′-disulphonaphth-2′-ylazo)-2,5-dimethoxyaniline, 4-phenylazo-2-aminophenol, 2-(N,N-dimethylsulphonylamino)-aniline and 2-(N,N-ditosylamino)-aniline.

Thus, the compounds of the invention include copper, nickel, chromium or cobalt complexes of a compound of formula

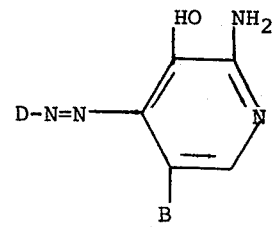

in which B is chloro, bromo or hydrogen;

D is phenyl or naphthyl that contains, in the position ortho to the azo bridge, hydroxyl, amino or carboxyl, and where said phenyl is further unsubstituted or substituted by chloro, bromo, methyl, nitro, cyano, methylsulphonyl, trifluoromethyl, carbomethoxy, carboethoxy, hydroxyethylsulphonyl, chloroethylsulphonyl, sulfonamido, N-methylsulphonamido, N,N-dimethylsulphonamido, N,N-diethylsulphonamido, N,N-di(hydroxyethyl) sulfonamido, N-phenylsulfonamido, methoxy, sulfophenylazo, sulfonaphthylazo phenylazo, acetylamino, acetyl, $CONH_2$, tosylamino, or a fibre-reactive acylamino group where fibre-reactive acyl is selected from the group consisting of chloroacetyl, bromoacetyl, β-chloropropionyl, β-bromopropionyl, α,β-dichloropropionyl, α,β-dibromopropionyl, chloromaleyl, acrylyl, β-chloroacrylyl, β-bromoacrylyl, α-chloroacrylyl, α-bromoacrylyl, α,β-dichloroacrylyl, α,β-dibromoacrylyl, trichloroacrylyl, chlorocrotonyl and propiolyl, and where said naphthyl is further unsubstituted or substituted by sulfo, sulfonamido, nitro, acetylamino, or sulfophenylazo.

The azo compounds already mentioned which do not correspond to the formula (1), and which may be present, in addition to an azo compound of the formula (1), as ligands in 1:2-complexes, can also be derived from the abovementioned diazo components and from the coupling components mentioned below: phenols, such as, for example, p-cresol, 3,4-dimethylphenol, 2,4-dimethylphenol, 2- or 3-acetylamino-4-methylphenol, 4-t-butylphenol, 2-hydroxy-5,6,7,8-tetrahydronaphthalene, 2-hydroxy-3-sulphonic acid-5,6,7,8-tetrahydronaphthalene, 2-carboethoxyamino-4-methylphenol, resorcinol, m-aminophenol, 2,4-dihydroxyacetophenone, 2,4-dihydroxyazobenzene, 2,4-dihydroxyazobenzene-2′- or -4′-sulphonic acid, 2,4-dihydroxyazobenzene-2′,5′-disulphonic acid, 2,4-dihydroxy-4′-nitroazobenzene, 2,2′,4-trihydroxyazobenzene-3′,5′-disulphonic acid, 2,4-dihydroxy-4′- or -5′-(acetylamino)-azobenzene-2′-sulphonic acid, 4-(2″,4″-dihydroxyphenylazo)-4′-nitrostilbene-2,2′-disulphonic acid; naphthols, such as, for example, 2-naphthol, 1,3- or 1,5-dihydroxynaphthalene, 2-naphthol-6-sulphonic acid, 1,8-dihydroxynaphthalene-3,6-disulphonic acid, 1,3-dihydroxynaphthalene-5-, -6- or -7-sulphonic acid, 1,3-dihydroxynaphthalene-5,7-disulphonic acid, 2-naphthol-6-sulphonamide, 2-naphthol-6-β-hydroxyethylsulphone, 1-amino-7-naphthol, 1-acetylamino-7-naphthol, 1-propionylamino-7-naphthol, 1-carbomethoxyamino-7-naphthol, 1-carboethoxyamino-7-naphthol, 1-carbopropoxy-amino-7-naphthol, 1-dimethylaminosulphonylamino-7-naphthol, 2-amino-5-naphthol-7-sulphonic acid, 2-amino-5-naphthol-1,7-disulphonic acid, 1-amino-4-naphthol, 2-amino-6-naphthol, 2-amino-6-naphthol-8-sulphonic acid, 2-acetylamino-5-naphthol-7-sulphonic acid, 2-benzoylamino-5-naphthol-7-sulphonic acid, 2-phenylamino-5-naphthol-7-sulphonic acid, 2-(3'-sulphoanilino)-5-naphthol-7-sulphonic acid, 2-amino-8-naphthol-6-sulphonic acid, 2-acetylamino-8-naphthol-6-sulphonic acid, 2-(3'- or 4'-aminobenzoylamino)-5-naphthol-7-sulphonic acid, 2-(3'- or 4'-aminobenzoylamino)-5-naphthol-7-sulphonic acid, 2-(3'- or 4'-aminobenzoylamino)-8-naphthol-6-sulphonic acid, 1-(3'- or 4'-aminobenzoylamino)-8-naphthol-3,6-disulphonic acid, 2-(3'- or 4'-aminoanilino)-5-naphthol-7-sulphonic acid, 2-(3'- or 4'aminoaniline)-8-naphthol-6-sulphonic acid, 1(3'- or 4'-aminoanilino)-8-naphthol-3,6-disulphonic acid, 2-(3'-amino-4'-sulphoanilino)-5-naphthol-7-sulphonic acid, 2-phenylamino-8-naphthol-3,6-disulphonic acid, 2-(4'-amino-3'-sulphoanilino)-5-naphthol-7-sulphonic acid, 2-(4'-amino-3'-sulphoanilino)-8-naphthol-6-sulphonic acid, 1-amino-8-naphthol-3,6-, -2,4- or -4,6-disulphonic acid, 1-amino-8-naphthol-4-sulphonic acid, 1-phenylamino-8-naphthol-4-sulphonic acid, 1-amino-5-naphthol-7-sulphonic acid, 1-acetylamino-8-naphthol-3,6- or -4,6-disulphonic acid, 1-benzoylamino-8-naphthol-3,6- or -4,6-disulphonic acid, 1-phenylamino-8-naphthol-3,6- or -4,6-disulphonic acid, 1-naphthol-4-sulphonic acid, 1-naphthol-4,6-disulphonic acid, 2-naphthol-6,8-disulphonic acid, 1-naphthol-5-sulphonic acid, 2-naphthol-3,6-disulphonic acid, 2-naphthol-3,6,8-trisulphonic acid, 2-amino-8-naphthol-3,6-disulphonic acid, 6-acetyl-2-naphthol, 4-acetyl-2-naphthol, 4-methoxy-1-naphthol, 4-acetyl-1-naphthol, 1-naphthol-3-, -4-or -5-sulphonamide, 2-naphthol-3-, -4-, -5-, -6 -, -7- or -8-sulphonamide, 5,8-dichloro-1-naphthol, 2-methylamino-5-naphthol-7-sulphonic acid, 2-methylamino-8-naphthol-6-sulphonic acid, 1-butylamino-8-naphthol-3,6-disulphonic acid, 1-naphthol-3,6,8-trisulphonic acid, 6-β-hydroxyethylsulphonyl-2-naphthol-3-sulphonic acid, 1-naphthol-3,6- or -3,8-disulphonic acid, 2-(4'-nitrophenylazo)-1-amino-8-naphthol-3,6- or -3,8-disulphonic acid, 2-(4'-nitrophenylazo)-1-amino-8-naphthol-3,6-disulphonic acid, 2-(2'- or 4'-sulphophenylazo)-1-amino-8-naphthol-3,6-disulphonic acid, 1,4-dichloro-8-naphthol, 1-naphthol-8-sulphonic acid, 2-(2',5'-disulphophenylazo)-1-amino-8-naphthol-3,6-disulphonic acid, 2-naphthol-7- or -8-sulphonic acid; heterocyclic coupling components, such as barbituric acid, 2,6-dihydroxy-3-cyano-4-methyl-pyridine; pyridone, such as, for example, 1-methyl-3-cyano-4-ethyl-6-hydroxy-pyridone, 1-amino-3-cyano-4-methyl-6-hydroxy-pyridone, 1-phenyl-3-carbamido-4-methyl-6-hydroxy-pyridone, 2,4-dihydroxyquinoline; 5-pyrazolones, such as 3-methyl-5-pyrazolone, 1,3-dimethyl-5-pyrazolone, 5-pyrazolone-3-carboxylic acid and its amides, preferably 1-aryl-5-pyrazolones, such as 1-phenyl-3-methyl-5-pyrazolone, 1-(2'-, 3'- or 4'-methylphenyl)-3-methyl-5-pyrazolone, 1-(2'-, 3'- or 4'-sulphophenyl)-3-methyl-5-pyrazolone, 1-[3'- or 4'-(β-hydroxyethylsulphonyl)-phenyl]-3-methyl-5-pyrazolone, 1-phenyl-3-carboxy-5-pyrazolone, 1-(3'-or 4'-aminophenyl)-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-( 3'- or 4'-aminophenyl)-3-carboxy-5-pyrazolone, 1-(3'-amino-4'-sulphophenyl)-3-(carboxy- or methyl)-5-pyrazolone, 1-(4'-amino-3'-sulphophenyl)-3-carboxy- or methyl)-5-pyrazolone, 1-(2'-, 3'- or 4'-nitrophenyl)-3-methyl-5-pyrazolone, 1-(2' , 5'- or 3',4'-dichlorophenyl)-3-methyl-5-pyrazolone, 1-(2'-, 3'- or 4'-sulphamylphenyl)-3-methyl-5-pyrazolone, 1-(2'-, 3'- or 4'-methylsulphonylphenyl)-3-methyl-5-pyrazolone, 1-phenyl-5-pyrazolone-3-carboxylic acid cresidide, 1-phenyl-5-pyrazolone-3-carboxylic acid 2'-toluidide, 1-phenyl-5-pyrazolone-3-carboxylic acid anilide, 1,3-diphenyl-5-pyrazolone 1-(2'-, 3'- or 4'-N-methylsulphamylphenyl)-3-methyl-5-pyrazolone, 1-(6'-chloro-3'-methyl-4'-sulphophenyl)-3-methyl-5-pyrazolone, 1-(2',5'-dichloro-4'-sulphophenyl)-3-methyl- 5-pyrazolone, 1-(2'-methyl-5'-sulphophenyl)-3-methyl-5-pyrazolone, 1-(4'-chloro-2'-sulphophenyl)-3-methyl-5-pyrazolone, 1-(6'-chloro-4'-sulpho-2'-methylphenyl)-3-carboethoxy-5-pyrazolone, 1-(2',5'-disulphophenyl)-3-methyl-5-pyrazolone, 1-(4'-sulphophenyl)-3-carboxy-5-pyrazolone, 1-(2'-, 3'- or 4'-carboxyphenyl)-3-methyl-5-pyrazolone, 1-(6'-chloro-4'-sulpho-2'-methylphenyl)-3-methyl-5-pyrazolone, 3-carboxy-5-pyrazolone; acetoacetic acid amides, preferably acetoacetanilides and benzoylacetanilides, such as, for example, acetoacetanilide, acetoacet-4-(β-hydroxyethylsulphonyl)-anilide, acetoacet-o-anisidide, acetoacet-o-toluidide, acetoacet-o-chloroanilide, acetoacetanilide-3- or -4-sulphonic acid, acetoacet-3- or -4-aminoanilide, acetoacet-m-xylidide, acetoacetanilide-2-, -3- or -4-carboxylic acid, benzoylacetanilide, benzoylacetanilide-3- or -4-sulphonic acid, benzoylacet-3- or -4-aminoanilide, acetoacetanilide-4-sulphonamide; naphthylamines, such as, for example, 2-naphthylamine, 1-naphthylamine, 1-naphthylamine-4-sulphonic acid, 2-methylaminonaphthalene, 2-aminonaphthalene-6-sulphonamide, 2-amino-8-naphthol-6-sulphonic acid, 2-methylamino-8-naphthol-6-sulphonic acid, 2-phenylamino-8-naphthol-6-sulphonic acid, 2-phenylaminonaphthalene, 2(3'-chlorophenyl)-aminonaphthalene, 2-(2'-carboxyphenyl)-aminonaphthalene, 2-aminonaphthalene-6-sulphonic acid, and 2-aminonaphthalene-6-sulphonic acid N-methylamide.

Compounds of the formula (1) or the corresponding heavy metal complexes which contain one or more reactive groups can be manufactured by using diazo components or coupling components which already contain reactive groups. In many cases it is, however, also possible to introduce reactive groups subsequently into the azo compounds. The introduction can take place after coupling or after metallisation.

Of particular interest are these compounds of the formula (1) or heavy metal complexes thereof which contain a 6-membered heterocyclic radical bonded via an amino group or an aliphatic reactive radical containing not more than three carbon atoms.

The introduction of the reactive radical is preferably effected by acylation of corresponding azo compounds which contain an acylatable amino group, or of corresponding diazo components which in addition to the amino group to be diazotised also contain a further acylatable amino group, or a group such, for example, as the nitro group or the acetylamino group, which can be converted, for example by reduction of saponification, into an acylatable amino group.

As corresponding starting compounds (diazo components or coupling components) which, as described above, are suitable for the introduction of a reactive radical, there may, for example, be mentioned:

Diazo components: 1,3-diaminobenzene-4-sulphonic acid, 1,4-diaminobenzene-2-sulphonic acid, 1,4-diaminobenzene-2,5-or -2,6-disulphonic acid, 1-amino-4-nitrobenzene, 1-amino-2-chloro-4-nitrobenzene, 6-acetylamino-4-chloro-2-aminophenol, 6-nitro-4-methyl-2-aminophenol, 4-nitro-2-aminophenol-6-sulphonic acid, 6-acetylamino-1-amino-2-naphthol-4-sulphonic acid and other compounds, for example compounds mentioned in the recital of possible diazo components.

Coupling components: 2-acetylamino-4-methylphenol, m-aminophenol, 2,4-dihydroxy-4'-nitroazobenzene, 1-amino-7-naphthol, 2-amino-5-naphthol-7-sulphonic acid, 2-acetylamino-5-naphthol-7-sulphonic acid, 1(3'- or 4'-aminoanilino)-8-naphthol-3,6-disulphonic acid, 1-(4'-amino-3'-sulphophenyl)-3-methyl-5-pyrazolone, 2-naphthylamine and other compounds, for example compounds mentioned in the list of possible coupling components.

As azo compounds of the formula (1), or further ligands, not corresponding to the formula (1), in 1:2-heavy metal complexes, into which reactive radicals (that is to say after coupling or after metallisation, see above) can be introduced, it is for example possible to use the coupling products of the abovementioned diazo components or coupling components with appropriate compounds which can be coupled, and these can optionally in turn contain amino groups which can be acylated, so that compounds of the formula (1) or corresponding heavy metal complexes are produced, which contain more than one reactive group in the finished molecule or complex.

As acylating agents which contain a reactive radical in addition to the acylating position, it is in particular possible to use the halides or anhydrides of organic acids which contain easily replaceable atoms or groups of atoms.

As acylating agents which contain a fibre-reactive radical, the following may, for example, be mentioned: chloroacetyl chloride or bromoacetyl chloride, β-chloropropionyl chloride or β-bromopropionyl chloride, α,β-dichloro-propionyl chloride or α,β-dibromopropionyl chloride, chloromaleic anhydride, carbyl sulphate, acrylic chloride, β-chloroacrylic chloride or β-bromoacrylic chloride, α-chloroacrylic chloride or α-bromoacrylic chloride, α,β-dichloroacrylic chloride or α,β-dibromoacrylic chloride, trichloroacrylic chloride, chlorocrotonyl chloride, propiolic acid chloride, 3,5-dinitro-4-chlorobenzene-sulphonic acid chloride or -carboxylic acid chloride, 3-nitro-4-chlorobenzenesulphonic acid chloride or -carboxylic acid chloride, 2,2,3,3-tetrafluorocyclobutane-1-carboxylic acid chloride, β-chloroethylsulphonylendomethylene-cyclohexanecarboxylic acid chloride, acrylylsulphonylendomethylene-cyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or -sulphonic acid chlorides and above all the following compounds, which possess at least 2 nitrogen atoms as hetero-atoms of a 6-membered structure: 4,5-dichloro-1-phenylpyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or -sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloro pyrimidine, 2,6-bis-methanesulphonylpyridine-4-carboxylic acid chloride 2,4-dichloro-5-chloromethyl-6-methyl-pyrimidine, 2,4-dibromo-5-bromomethyl-6-methyl-pyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethyl-pyrimidine or especially 2,4-dimethanesulphonyl-5-chloro-6-methylpyrimidine, 2,4,6-trimethanesulphonyl-1,3,5-triazine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxylic acid amide or -sulphonic acid amide or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulphonic acid chloride, 5-nitro-6-methyl-2,4-dichloropyrimidine, 2,4,6-trichloro-5-chloropyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro (-tribromo or -trifluoro)-1,3,5-triazines, as well as 4,6 -dichloro (-dibromo or -difluoro)-1,3,5-triazines which are substituted in the 2-position by an aryl or alkyl radical, for example a phenyl methyl or ethyl radical, or by the radical of an aliphatic or aromatic mercapto compound bonded via the sulphur atom, or hydroxy compound bonded via the oxygen atom, or especially by a $NH_2$ group or by the radical of an aliphatic, heterocyclic or aromatic amino compound bonded via the nitrogen atom. As such compounds, the radicals of which can be bonded to the triazine nucleus in the 2-position by reaction with trihalogenotriazines, the following may for example be mentioned: aliphatic or aromatic mercapto compounds or hydroxyl compounds, such as thioalcohols, thioglycollic acid, thiophenols, alkoxyalkanols, methyl alcohol, ethyl alcohol, isopropyl alcohol, glycollic acid, phenol, chlorophenols or nitrophenols, phenolcarboxylic and phenolsulphonic acids, naphthols, naphtholsulphonic acids and the like, but especially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamine, propanolamines, benzylamine, cyclohexylamine, morpholine, piperidine, piperazine, aminocarbonic acid esters, aminoacetic acid ethyl ester, aminoethanesulphonic and N-methylaminoethanesulphonic acid, but above all aromatic amines, such as aniline, N-methylaniline, toluidines, xylidines, chloroanilines, p- and m-aminoacetanilide, aminophenols, anisidine, phenetidine and especially anilines containing acid groups, sulphanilic acid, methanilic acid, orthanilic acid, anilinedisulphonic acid, aminobenzylsulphonic acid, aniline-ω-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid, and also coloured compounds, or compounds possessing dyestuff character, for example 4-nitro-4'-aminostilbenedisulphonic acid, 2-nitro-4'-aminodiphenylamino-4,3'-stilbene-disulphonic acid, 2-nitro-4'-aminodiphenylamine-4,3'-disulphonic acid and especially aminoazo dyestuffs or aminoanthraquinones or phthalocyanines which still contain at least one reactive amino group.

The introduction of the substituent which is in the 2-position of the triazine radical can also take place after the condensation with the starting diamine or after the reaction, according to the invention, to give the azo compound of the formula (1).

Apart from the fibre-reactive radicals which can be introduced by acylation, further fibre-reactive radicals which may be mentioned are, for example, the vinylsulphone, β-sulphatoethylsulphone or β-thiosulphatoethylsulphone, β-thiosulphatopropionylamide, β-thiosulphatoethylsulphonylamide, or sulphonic acid-N,β-sulphatoethylamide group, which are introduced into the diazo component in a different manner, for example by ester formation or thioester formation.

As compounds which contain a fibre-reactive radical which cannot be introduced by acylation, and in which the fibre-reactive radical is thus preferably not bonded via an amino group but is directly bonded to the benzene radical, the sulpho-esters of the following sulphones may, in particular, be mentioned: 1-amino-2-methoxy-5-(β-hydroxyethyl)-phenylsulphone, 1-aminobenzene-3- or -4-β-hydroxyethylsulphone, 1-amino-2-methyl-benzene-5-β-hydroxyethylsulphone, 1-amino-4-(β-hydroxyethylsulphonylpropionylaminomethyl)-benzene, 1-amino-4-(β-hydroxyethylsulphonylamino)-benzene, and also reactive compounds obtainable via corresponding methylols by Einhorn's method, such as, for example, 1-amino-4-chloroacetylaminomethylbenzene or 1-amino-3-chloroacetylaminomethyl-benzene-6-sulphonic acid.

The condensation with the acid halides or anhydrides or with the heterocyclic halogen compounds is appropriately carried out in the presence of acid-binding agents such as, for example, sodium carbonate or sodium hydroxide, and under such conditions that an unsaturated bond or a replaceable halogen atom still remains in the final product.

The azo compounds and their heavy metal complexes, in particular the chromium and copper-containing azo compounds, which are obtainable according to the present process and its variantes, are new; they are suitable for dyeing and printing the most diverse substances, but above all for dyeing animal materials, such as silk, leather and especially wool, though they are also suitable for dyeing and printing synthetic fibres of polyamides or polyurethanes, polyacrylonitrile fibres and the like.

If there is no anionic charge present, i.e., if no sulphonic acid groups or the like are present, the solubility in water of the azo compounds according to the invention and their metal complex compounds is reduced. Instead, a far better solubility in organic solvents results.

The complexes having one or more sulphonic acid groups are especially suitable for use as dyestuffs for wool, silk, leather and especially polyamides. The complexes containing sulphonamide groups can be used as lake-forming dyestuffs. If the complexes which possess a fibre-reactive group contain two or more sulphonic acid groups, they can be employed as reactive dyestuffs in the usual manner; if sulphonic acid groups are entirely absent, the products are reactive disperse dyestuffs.

The heavy metal complexes according to the invention which contain a cationic charge can especially be used as dyestuffs for polyacrylonitrile fibres.

The new byestuffs can be used for dyeing nitrogen-containing fibres, such as wool, for example from acetic to neutral baths, and optionally, that is to say when using dyestuffs which are only sparingly soluble in water, with the addition of suitable dispersing agents. Especially when using complexes of good solubility in water, that is to say containing two or more sulpho groups in the azo compound, dyeing is appropriately carried out with the addition of the assistants customary in dyeing practice.

Furthermore, nitrogen-containing fibres, especially wool, can be dyed advantageously with the dyestuffs manufactured according to the present process if the fibres are treated, appropriately in a continuous process, for example on a padder, with an aqueous preparation which contains a wool dyestuff and an assistant which, with water and optionally with additives, is capable of forming a system of two liquid phases with a miscibility gap wherein the ratio of the water, optionally containing additives, and the assistant lies within the miscibility gap or near it, the miscibility gap being already present at a relatively low content of assistants, and over a large range of the miscibility gap the phase which contains more assistant accounts for a substantial part, and thereafter the material provided with the aqueous preparation is subjected to a heat treatment.

The dyeings and prints obtainable with the new dyestuffs are as a rule distinguished by levelness, resistance to acid and alkali, good fastness to light and good fastness to rubbing; as a rule, they hardly change their appearance in artificial light, and in part they show very interesting and valuable shades.

The 2-amino-3-hydroxypyridine used as coupling component is known. The 5-chloro- or 5-bromo-2-amino-3-hydroxypyridine can be manufactured by reacting 2-amino-3-hydroxypyridine with phosgene, halogenating the resulting pyrido-oxazolone with the corresponding free halogen (cf. Belgian Pat. No. 769,051)

and treating the resulting 5-halogenopyrido-oxazolone in aqueous alkaline solution in such a manner that the oxazolone ring is split and the resulting N-carbamic acid is saponified.

In the examples which follows the parts, unless otherwise stated, denote parts by weight, and the percentages denote percentages by weight. The relationship of parts by weight to parts by volume is the same as of the gram to the $cm^3$.

EXAMPLE 1

7.7 parts of 4-nitro-2-amino-1-hydroxybenzene are dissolved by heating in 60 parts of water and 7.5 parts of 30 percent hydrochloric acid. The resulting solution is cooled to 5°C by addition of ice and diazotised at 5° to 10°C with 12.5 parts by volume of 4N sodium nitrite solution.

The resulting diazo solution is made slightly brilliant-alkaline with 15 percent sodium carbonate solution and then added dropwise to a solution cooled to 0°C of 5.5 parts of 2-amino-3-hydroxypyridine in 150 parts of water, 7.5 parts of sodium carbonate and 5 parts of 30 percent sodium hydroxide. The only partly precipitated dyestuff is completely precipitated by addition of sodium chloride, filtered and dried, to give a compound of the formula

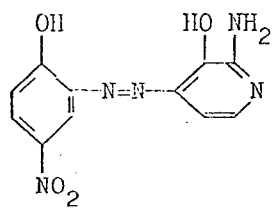

13.75 parts of the dyestuff obtained in this manner are suspended in 600 parts of warm (50°C) water. A solution of 9.3 parts of cobalt-II-sulphate, 9.3 parts of tartaric acid and 10 parts of sodium hydroxide in 250 parts of water is added and the batch is heated to 80°C. The metallisation is complete after stirring for about half an hour at 80°C. The resulting dyestuff suspension is completely precipitated by addition of sodium chloride, filtered and dried. The dyestuff dyes polyamide fibres from a weakly acid bath in bluish green shades.

Dyestuffs which dye polyamide fibres in similar shades are obtained by using 2-amino-4-chlorophenol or 2-amino-4-chlorophenol-5-sulphamide as diazo component.

13.75 parts of the above described dyestuff are dissolved with stirring in 400 parts of water of 50°C and 4 parts of sodium hydroxide. Upon addition of 65 parts of a solution of sodium disalicylato-chromiate-III (with a content of 3.07 vol. percent of $Cr_2O_3$) the reaction mixture is stirred under reflux until no more metal-free starting dyestuff is detectable. The resulting 1:2 chromium complex of a dark green shade is precipitated from the solution by addition of sodium chloride, isolated by filtration and dried in vacuo after washing with sodium chloride solution. The resulting dyestuff dyes polyamide fibres from a slightly acid bath in fast, greyish green shades.

EXAMPLE 2

24.6 parts of 6-acetylamino-2-amino-1-oxybenzene-4-sulphonic acid are diazotised in the conventional manner. The resulting diazonium compound is coupled, in the presence of excess calcium hydroxide, with 11.1 parts of 2-amino-3-hydroxypyridine in 200 parts of ice water. The resulting dyestuff is precipitated by addition of hydrochloric acid, filtered off an washed with concentrated sodium chloride solution. The acetylamino group is saponified by stirring the dyestuff paste in 250 parts of a 5 percent sodium hydroxide solution and then stirring for 4 hours at boiling temperature. The clear, violet red solution contains the dyestuff of the following constitution:

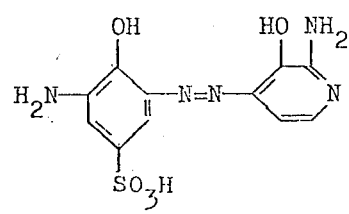

The conversion into the 1:2 cobald complex is effected by treating the alkaline solution of the saponified dyestuff at a temperature of 80°–85°C with a solution of 15.0 parts of cobalt-II-sulphate heptahydrate and 15.0 parts of tartaric acid in 250 parts of water, in the course of which rapid and complete metallisation occurs, accompanied by a change in colour from red to violet blue.

The solution of the 1:2 cobald complex is then cooled to 0°–5°C, neutralized with dilute hydrochloric acid, and then treated with 18 parts of sodium carbonate. A solution of 26.0 parts by weight of $\alpha,\beta$-dibromopropionyl chloride in 125 parts by volume of acetone is then added dropwise at constant temperature. Accompanied by an increase in temperature from 15° to 20°C the batch is stirred until diazotisable amino groups are no longer detectable. The new dyestuff is precipitated by addition of potassium chloride, isolated by filtration and washed with concentrated potassium chloride solution. After drying and grinding, the new dyestuff is in the form of a dark, readily water soluble powder with a blue shade. According to the indicated dyeing instruction, greyish blue dyeings which are fast to wet treatment are obtained on woollen fabrics.

The first column of the following table lists further azo dyestuffs which are obtained according to the preceding Example and, when reacted with the metals listed in the second column to give complexes, produce dyeings on polyamide or wool with the shades indicated in the third column.

| | I | II | III |
|---|---|---|---|
| 1 | 2-hydroxyphenyl(5-SO₂NH₂)-N=N-(3-hydroxy-2-amino)pyridine | cobalt | blue |
| 2 | " | chromium | greyish blue |
| 3 | 2-hydroxy-4-nitrophenyl-N=N-(3-hydroxy-2-amino)pyridine | copper | greenish blue |
| 4 | " | cobalt | bluish grey |
| 5 | 2-carboxyphenyl-N=N-(3-hydroxy-2-amino)pyridine | copper | violet |
| 6 | " | nickel | violet red |
| 7 | " | cobalt | bluish violet |
| 8 | 2-carboxy-4-chlorophenyl-N=N-(3-hydroxy-2-amino)pyridine | cobalt | bluish violet |
| 9 | 2-carboxy-4-nitrophenyl-N=N-(3-hydroxy-2-amino-5-bromo)pyridine | copper | bluish green |
| 10 | " | cobalt | green |
| 11 | 3-sulfo-5-chloro-2-hydroxyphenyl-N=N-(3-hydroxy-2-amino)pyridine | copper | blue |

| | I | II | III |
|---|---|---|---|
| 12 | " | nickel | violet blue |
| 13 | " | cobalt | bluish green |
| 14 | 3-sulfo-2-hydroxy-5-nitrophenyl-azo / 2-amino-3-hydroxy-5-bromo-pyridyl-4 (HO$_3$S, OH, NO$_2$ on left ring; HO, NH$_2$, Br on pyridine) | copper | blue |
| 15 | " | cobalt | bluish green |
| 16 | " | chromium | blue |
| 17 | 3-sulfo-2-hydroxy-5-(2,3-dibromopropionylamino)phenyl-azo-(2-amino-3-hydroxy-pyridyl-4); NHCO-CHBr-CH$_2$Br substituent | cobalt | blue |
| 18 | same as 17 (NHCO-CHBr-CH$_2$Br) | chromium | grey |
| 19 | 2-carboxy-5-(chloroacetylamino)phenyl-azo-(2-amino-3-hydroxy-pyridyl-4); COOH, HN-CO-CH$_2$Cl | cobalt | blue violet |

| | I | II | III |
|---|---|---|---|
| 20 | (structure: 2-hydroxyphenyl-azo-(2-amino-3-hydroxypyridyl), with additional azo linkage to phenyl-SO₃H) | copper | bluish grey |
| 21 | " | cobalt | greenish grey |
| 22 | (structure: 3-sulfophenyl-N=N-(hydroxy-methyl-phenyl)-N=N-(2-amino-3-hydroxypyridyl)) | copper | bluish grey |
| 23 | " | cobalt | green |
| 24 | (structure: 2-nitro-4-chloro-6-hydroxyphenyl-azo-(2-amino-3-hydroxypyridyl)) | cobalt | bluish green |
| 25 | " | chromium | blue |
| 26 | (structure: 2-(methylsulfonylamino)phenyl-N=N-(5-chloro-2-hydroxy-3-amino-pyridyl)) | nickel | violet |
| 27 | " | cobalt | bluish green |

| | I | II | III |
|---|---|---|---|
| 28 | 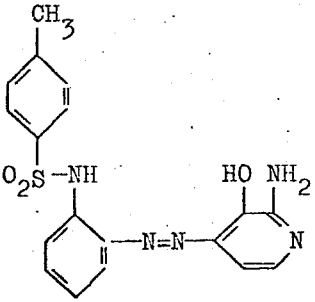 | copper | greenish blue |
| 29 | " | nickel | violet blue |
| 30 | " | cobalt | greenish blue |
| 31 | 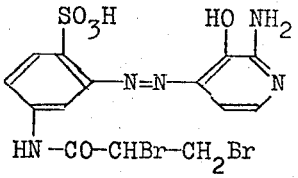 | copper | reddish violet |
| 32 | " | nickel | ruby |
| 33 | 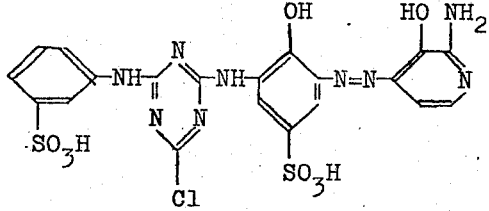 | copper | blue |
| 34 | " | cobalt | greyish blue |
| 35 | 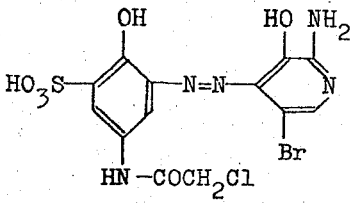 | copper | blue |
| 36 | " | nickel | violet |
| 37 | 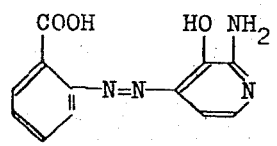 | chromium | violet |
| 38 | 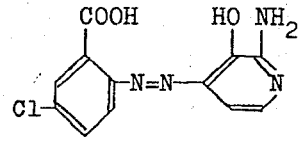 | chromium | violet |

| | I | II | III |
|---|---|---|---|
| 39 | (OH, HO₃S, Cl phenyl)−N=N−(pyridine with OH, NH₂) | chromium | blue |
| 40 | (OH, HO₃S, NO₂ phenyl)−N=N−(pyridine with OH, NH₂, Br) | nickel | blue |
| 41 | (COOH, HN-CO-CH₂Cl phenyl)−N=N−(pyridine with OH, NH₂) | chromium | violet |
| 42 | (phenyl-SO₃H)−NH−(triazine, Cl)−NH−(phenyl OH, SO₃H)−N=N−(pyridine OH, NH₂) | nickel | violet |
| 43 | " | chromium | greyish blue |
| 44 | (OH, NO₂ phenyl)−N=N−(pyridine with OH, NH₂, Br) | cobalt | green |
| 45 | " | chromium | greenish grey |

| | I | II | III |
|---|---|---|---|
| 46 | 2-hydroxy-3-[(2-amino-3-hydroxypyridin-4-yl)azo]-5-methyl-nitrobenzene (NO₂, OH, CH₃ substituents; HO, NH₂ on pyridine) | copper | blue |
| 47 | " | nickel | bluish grey |
| 48 | " | cobalt | bluish green |
| 49 | " | chromium | blue |
| 50 | 4-hydroxy-3-[(2-amino-3-hydroxypyridin-4-yl)azo]-phenylsulfamoyl-benzene (OH, SO₂NH-phenyl; HO, NH₂ on pyridine) | copper | blue |
| 51 | " | cobalt | blue |
| 52 | 2-hydroxy-3-[(2-amino-3-hydroxypyridin-4-yl)azo]-5-sulfo-nitrobenzene (NO₂, OH, SO₃H; HO, NH₂ on pyridine) | copper | blue |
| 53 | " | nickel | greyish blue |
| 54 | 2-hydroxy-3-[(2-amino-3-hydroxypyridin-4-yl)azo]-3,5-dichlorobenzene (Cl, OH, Cl; HO, NH₂ on pyridine) | copper | blue |
| 55 | " | cobalt | greenish blue |

| | I | II | III |
|---|---|---|---|
| 56 | ![structure: 2-hydroxy-5-methylsulfonyl-phenyl-N=N-(3-hydroxy-2-amino-pyridine)] | copper | violet blue |
| 57 | " | nickel | violet |
| 58 | " | cobalt | blue |
| 59 | ![structure: 2-carboxy-4-sulfo-phenyl-N=N-(3-hydroxy-2-amino-pyridine)] | copper | violet |
| 60 | " | nickel | reddish violet |

EXAMPLE 3

23.4 parts of 1-oxy-2-amino-4-nitrobenzene-6-sulphonic acid are diazotised in the customary manner. The resulting diazonium compound is coupled, in the presence of excess calcium hydroxide, with a solution of 11.1 parts of 2-amino-3-hydroxypyridine in 200 parts of ice water. The resulting dyestuff, which forms in good yield, is precipitated by addition of hydrochloric acid until the onset of a distinctly acid reaction, filtered off, and washed with sodium chloride solution. It has the following constitution:

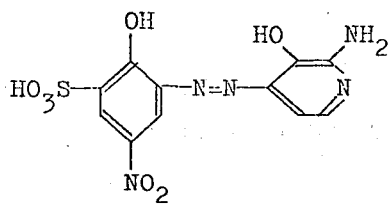

The conversion into the corresponding 1:1 copper complex is effected by stirring 35.5 parts of the obtained dyestuff in 600 parts of water of 50°C and 8 parts of sodium hydroxide. Upon addition of a solution of 27.5 parts of crystallised copper sulphate, 15.0 parts of tartaric acid and 20 parts of sodium hydroxide in 200 parts of water, the colour of the solution changes from reddish violet to greenish blue. The metallisation is complete after a brief time. The copper complex is precipitated from the solution by addition of sodium chloride, isolated by filtration and dried in vacuo after washing with dilute sodium chloride solution. With the readily water soluble dyestuff, which is obtained after grinding, it is possible to produce fast, greenish blue dyeings on polyamide fibres or woollen knitwear.

If 30.8 parts of crystallised nickel sulphate are used for the metallisation instead of copper sulphate, and the same procedure is otherwise carried out, the corresponding 1:1 nickel complex is formed which dyes woollen fabric or polyamide fibres from a slightly acid bath in fast blue shades.

EXAMPLE 4

13.75 parts of the dyestuff obtainable according to Example 1 from diazotised 4-nitro-2-amino-1-hydroxybenzene and 2-amino-3-hydroxypyridine, and 42.45 parts of the similarly obtainable dyestuff from diazotised 2-amino-1-hydroxybenzene-4-sulphonic-N-methyl amide and 2'-chloroacetoacetic anilide, are stirred together with 800 parts of water of 50°C and 10 parts of sodium hydroxide. Upon addition of a solution of 30 parts of crystallised cobald-II-sulphate in 150 parts of water, the metallising mixture is stirred at 50°–60°C until metal-free starting dyestuffs are no longer detectable. The dyestuff is precipitated with sodium chloride, filtered off, washed with dilute sodium chloride solution, dried in vacuo and ground. The new dyestuff produces level, green dyeings of good fastness properties on wool or polyamide fibres.

EXAMPLE 5

28.9 parts of the dyestuff obtainable according to the instructions of Example 1 from diazotised 6-nitro-4-methyl-2-amino-1-hydroxybenzene and 2-amino-3-hydroxypyridine, and 40 parts of the similarly obtainable dyestuff from diazotised 5-nitro-2-amino-1-hydroxybenzene and 2-aminonaphthalene-6-sulphonic-N-methyl amide, are stirred together with 200 parts of formamide at 70°C. 26 parts of cobalt-II-acetate are added and the metallising mixture is stirred at 70°–80°C until metal-free dyestuff is no longer detectable. The reaction mixture is diluted with 1,000 parts of sodium chloride and the precipitated dyestuff is filtered off, washed with dilute sodium chloride solution, washed, dried and ground. The resulting dyestuff dyes polyamide fibres from a weakly acid bath in fast, level blue shades.

EXAMPLE 6

25.8 parts of the dyestuff from diazotised 2-amino-benzene-1-carboxylic acid and 2-amino-3-hydroxypyridine, and 53,0 parts of the 1:1 chromium complex of the azo dyestuff from diazotised 1-amino-2-hydroxynaphthalene-4-sulphonic acid and 1-phenyl-3-methyl-5-pyrazolone, are suspended together in 500 parts of water of 50°C. A pH of 8 is adjusted and the reaction mixture is stirred at 90°–95°C until neither of the two starting dyestuffs is any longer detectable. The resulting unitary mixed complex of the formula

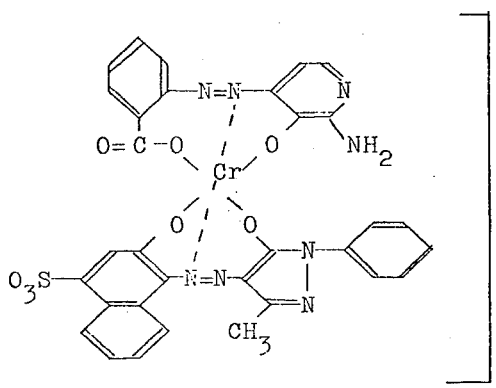

is precipitated from the clear violet solution by addition of sodium chloride, isolated by filtration, and dried in vacuo after washing with sodium chloride solution. With the readily water soluble dyestuff, which is obtained after grinding, it is possible to produce from a slightly acid bath full, reddish violet shades on polyamide fibres or woollen knitwear.

EXAMPLE 7

26.45 parts of the azo dyestuff from diazotised 4-chloro-2-amino-1-hydroxybenzene and 2-amino-3-hydroxypyridine, and 38.8 parts of the azo dyestuff from diazotised 5-nitro-2-amino-1-hydroxybenzene and 2-aminonaphthalene-6-sulphonic acid in the form of the 1:1 chromium complex, are reacted to give the unitary mixed complex according to the particulars of the preceding Example. The resulting dyestuff produces level, fast dark green shades from a slightly acid bath on polyamide fibres or wool yarn.

EXAMPLE 8

35.5 parts of the dyestuff obtainable according to the instructions of Example 3 from diazotised 1-oxy-2-amino-4-nitrobenzene-6-sulphonic acid and 2-amino-3-hydroxypyridine are suspended in 40° parts of water. After addition of 24 parts of chromium sulphate (with a content of 35.2 percent of $Cr_2O_3$), the reaction mixture is adjusted to pH 2,5 by addition of dilute sulphuric acid and then stirred under reflux until the starting dyestuff is completely converted into the corresponding 1:1 chromium complex. The precipitation of the complex dyestuff is brought to completion by addition of sodium chloride. The dyestuff, which is obtained by the usual processing, produces full, strong greenish blue shades from a sulphuric acid bath on woollen fabric.

DIRECTIONS FOR DYEING WOOLLEN FABRIC

At a temperature of 50° to 60°C, 100 parts of woollen fabric are put into a dyebath consisting of 3,000 parts of water, 5 parts of 40 percent acetic acid, 10 parts of sodium sulphate, 2 parts of the ethylene oxide addition product whose manufacture is described hereinbelow, and 1 part of the 1:2 cobalt complex mentioned in Example 1. After the bath has been heated to the boil within half an hour dyeing is carried out for a further hour at boiling temperature. After rinsing and drying the fabric there results a uniform greenish blue dyeing.

The ethylene oxide addition product may be manufactuee as follows:

100 Parts of industrial oleylamine are treated with 1 part of finely divided sodium and the mixture is heated to 140°C, when ethylene oxide is passed in at 135° to 140°C. As soon as the ethylene oxide has been rapidly taken up the reaction temperature is lowered to 120°–125°C and the passing in of ethylene oxide is continued until 113 parts of it have been taken up. The thus obtainable reaction product dissolved to a practically clear solution in water.

DIRECTIONS FOR DYEING POLYAMIDE

At a temperature of 50° to 60°C, 100 parts of nylon 6.6 fabric are put into a dyebath consisting of 3,000 parts of water, 5 parts of 40 percent acetic acid, 10 parts of sodium sulphate and 1 part of the copper complex mentioned in Example 1. After the bath has been heated to the boil within half an hour dyeing is carried out for a further hour at boiling temperature. After rinsing and drying the fabric there results a level bluish green dyeing.

A nylon fabric dyed in a fast, blue shade is obtained if, in the same dyeing process, 1 part of the 1:1 copper complex mentioned in Example 3 is used.

INSTRUCTION FOR DYEING WOOLLEN KNITWEAR 100 parts of woollen knitwear are put into a dyebath containing 3,000 parts of water, 5 parts of ammonium sulphate and 1 part of the chromium mixed complex described in Example 7. The bath is heated to the boil over the course of half an hour and dyeing is carried out for a further half an hour at boiling temperature. The goods are then rinsed and dried. A level, dark green dyeing is obtained.

We claim:
1. The copper, nickel, chromium or cobalt complex of a compound of formula

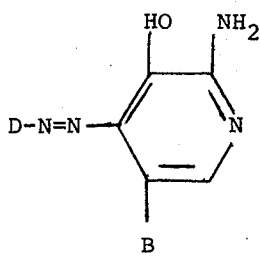

in which B is chloro, bromo or hydrogen;
D is phenyl or naphthyl that contains, in the position ortho to the azo bridge, hydroxyl, amino or carboxyl, and where said phenyl is further unsubstituted or substituted by chloro, bromo, methyl, nitro, cyano, methylsulphonyl, trifluoromethyl, carbomethoxy, carboethoxy, hydroxyethylsulphonyl, chloroethylsulphonyl, sulfonamido, N-methylsulphonamido, N,N-dimethylsulphonamido, N,N-diethylsulphonamido, N,N-di(hydroxyethyl)sulfonamido, N-phenylsulfonamido, methoxy, sulfophenylazo, sulfonaphthylazo phenylazo, acetylamino, acetyl, $CONH_2$, tosylamino, or a fibre-reactive acylamino group where fibre-reactive acyl is selected from the group consisting of chloroacetyl, bromoacetyl, β-chloropropionyl, β-bromopropionyl, α,β-dichloropropionyl, α,β-dibromopropionyl, chloromaleyl, acrylyl, β-chloroacrylyl, β-bromoacrylyl, α-chloroacrylyl, α-bromoacrylyl, α,β-dichloroacrylyl, α,β-dibromoacrylyl, trichloroacrylyl, chlorocrotonyl and propiolyl,
and where
said naphthyl is further unsubstituted or substituted by sulfo, sulfonamido, nitro, acetylamino or sulfophenylazo.

2. A complex according to claim 1 in which D is phenyl or substituted phenyl.

* * * * *

UNITED STATES PATENT OFFICE
CERTIFICATE OF CORRECTION

PATENT NO. : 3,870,695
DATED : March 11, 1975
INVENTOR(S) : Back et al.

It is certified that error appears in the above-identified patent and that said Letters Patent are hereby corrected as shown below:

COLUMNS 29 - 32 MISSING FROM SOFT COPIES

Please insert into the patents.

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*